United States Patent
Zhou et al.

(10) Patent No.: US 9,678,840 B2
(45) Date of Patent: Jun. 13, 2017

(54) FAST FAILOVER FOR APPLICATION PERFORMANCE BASED WAN PATH OPTIMIZATION WITH MULTIPLE BORDER ROUTERS

(71) Applicant: Cisco Technology, Inc., San Jose, CA (US)

(72) Inventors: Chao Zhou, Shanghai (CN); Will Lipeng Jiang, Shanghai (CN); Jun Liu, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 430 days.

(21) Appl. No.: 14/264,526

(22) Filed: Apr. 29, 2014

(65) Prior Publication Data

US 2015/0309894 A1   Oct. 29, 2015

(51) Int. Cl.
*H04L 12/26* (2006.01)
*G06F 11/20* (2006.01)
*H04L 12/707* (2013.01)
*H04L 12/751* (2013.01)
*H04L 12/703* (2013.01)

(52) U.S. Cl.
CPC .......... *G06F 11/2023* (2013.01); *H04L 45/02* (2013.01); *H04L 45/22* (2013.01); *H04L 45/28* (2013.01)

(58) Field of Classification Search
CPC ...... G06F 11/2023; H04L 45/02; H04L 45/22; H04L 45/28
USPC .......................................... 370/219, 278, 329
See application file for complete search history.

(56) References Cited

U.S. PATENT DOCUMENTS

| | | | |
|---|---|---|---|
| 6,779,051 B1 * | 8/2004 | Basil | H04L 12/4633 370/401 |
| 6,996,741 B1 * | 2/2006 | Pittelkow | G06F 11/2092 714/11 |
| 7,995,593 B2 * | 8/2011 | Vasseur | H04L 45/04 370/216 |
| 9,038,151 B1 * | 5/2015 | Chua | H04L 45/02 709/223 |

(Continued)

OTHER PUBLICATIONS

Network Working Group, G. Dommety, "Key and Sequence Number Extensions to GRE", Request for Comments: 2890, Sep. 2000, 8 pages.

*Primary Examiner* — Khaled Kassim
*Assistant Examiner* — Berhanu Belete
(74) *Attorney, Agent, or Firm* — Edell, Shapiro & Finnan, LLC

(57) ABSTRACT

According to one aspect, a control entity (such as a policy server) in communication with a plurality of border routers in a network, generates failover entries for one or more traffic flows. Each failover entry specifies a backup path to be used by a border router when the border router determines that a wide area network interface of the border router has failed. The control entity sends the failover entries to each of the border routers. A border router operating in a network stores failover entries for one or more traffic flows. For packets received at the border router either from a local area network interface or via a tunnel from another border router, when the border router detects that the wide area network interface has failed, the border router determines how to handle the packets based on the stored failover entries.

17 Claims, 7 Drawing Sheets

(56) References Cited

U.S. PATENT DOCUMENTS

| | | | |
|---|---|---|---|
| 2006/0002343 A1* | 1/2006 | Nain | H04W 80/04 370/331 |
| 2006/0098657 A1* | 5/2006 | Vasseur | H04L 45/04 370/392 |
| 2006/0256711 A1* | 11/2006 | Kusama | H04L 43/0811 370/216 |
| 2007/0254661 A1* | 11/2007 | Chowdhury | H04W 8/14 455/436 |
| 2008/0219268 A1* | 9/2008 | Dennison | H04L 12/4625 370/395.2 |
| 2009/0003211 A1* | 1/2009 | Akyamac | H04J 14/0284 370/235 |
| 2009/0157901 A1* | 6/2009 | Asati | H04L 29/12386 709/238 |
| 2009/0268607 A1* | 10/2009 | Wang | H04L 45/02 370/218 |
| 2010/0265950 A1* | 10/2010 | Foxworthy | H04L 12/4633 370/392 |
| 2011/0158155 A1* | 6/2011 | Park | H04W 40/12 370/315 |
| 2011/0228785 A1 | 9/2011 | Filsfils et al. | |
| 2012/0020224 A1* | 1/2012 | Vasseur | H04L 12/4633 370/236 |
| 2012/0183000 A1 | 7/2012 | Vasseur et al. | |
| 2013/0051224 A1 | 2/2013 | Vasseur et al. | |
| 2013/0064243 A1* | 3/2013 | Akiyoshi | H04L 45/38 370/389 |
| 2015/0010152 A1* | 1/2015 | Proulx | H04L 63/0428 380/255 |

\* cited by examiner

FAST FAILOVER FOR APPLICATION PERFORMANCE BASED WAN PATH OPTIMIZATION WITH MULTIPLE BORDER ROUTERS

TECHNICAL FIELD

The present disclosure relates to management of traffic flows in a network environment.

BACKGROUND

In a networking environment, such as a datacenter or cloud environment, application performance based wide area network (WAN) path optimization is employed to optimize communication, for example, from cloud-to-cloud or cloud-to-Internet environments. In such a deployment, a central policy server collects performance information regarding traffic flows and WAN exit link usage reported from each border router under its control. Based on this information, the policy server makes routing decisions for traffic flows and redirects traffic flows among border routers to improve performance, perform load sharing, and improve failure tolerance.

DESCRIPTION OF EXAMPLE EMBODIMENTS

Overview

According to one embodiment, a control entity (such as a policy server) in communication with a plurality of border routers in a network generates failover entries for one or more traffic flows. Each failover entry specifies a backup path to be used by a border router when the border router determines that a wide area network interface of the border router has failed. The control entity sends the failover entries to each of the border routers.

According to another embodiment, a border router operating in a network stores failover entries for one or more traffic flows. Again, each failover entry specifies a backup path to be used by the border router when the border router determines that a wide area network interface of the border router fails. For packets received at the border router either from a local area network interface or via a tunnel from another border router, when the border router detects that the wide area network interface has failed, the border router determines how to handle the packets based on the stored failover entries.

Example Embodiments

Figure 1:
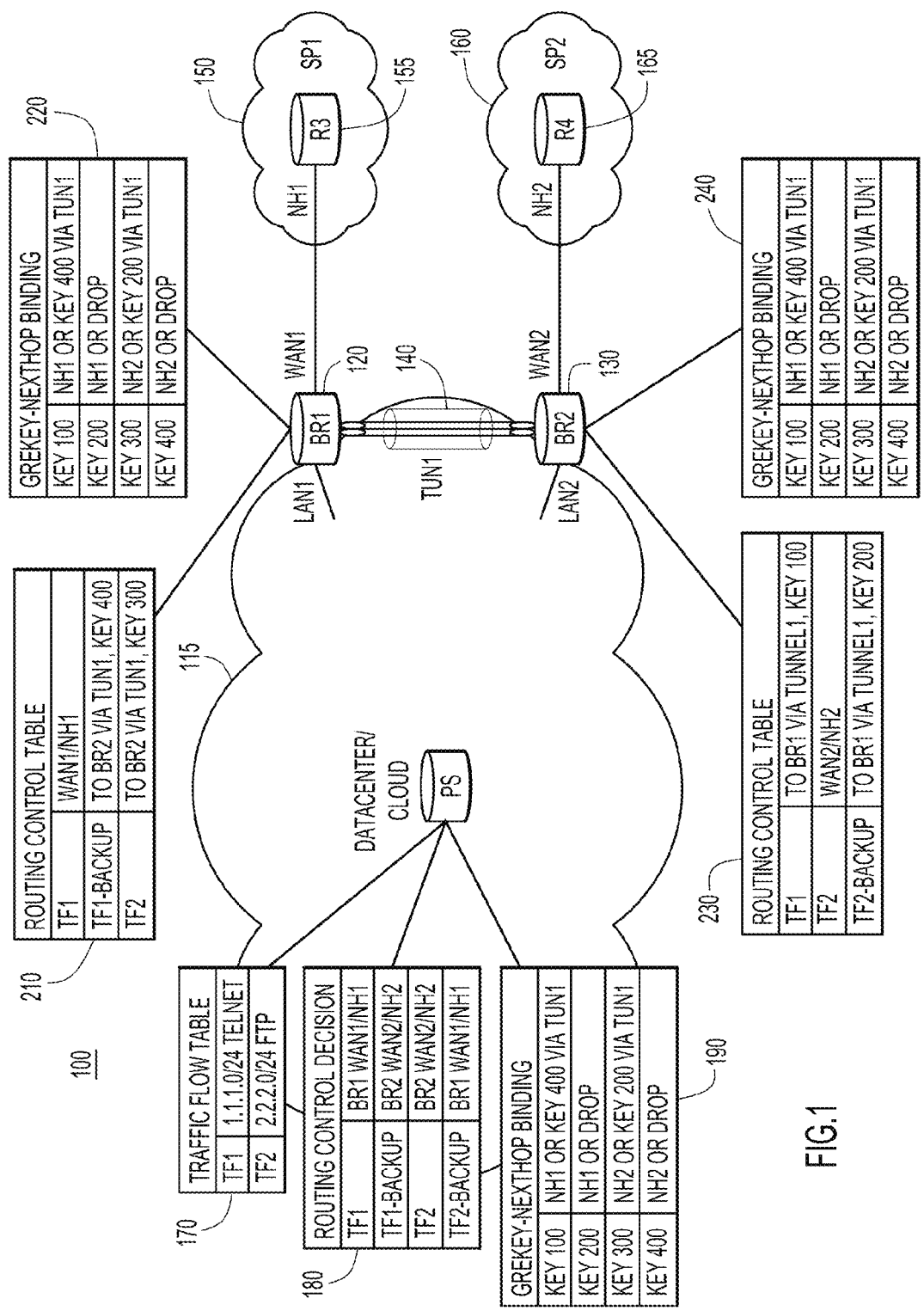
FIG. 1 illustrates an example network topology including a policy server and multiple border routers, and in which the policy server disseminates information to the border routers, in accordance with an example embodiment.

Techniques are presented herein for managing traffic flow in a network environment. An example network topology (hereinafter referred to as a "network") 100 is shown in FIG. 1. A network management device, such as a policy server (PS) 110, monitors data traffic through traffic flow management devices, such as border routers 120 and 130 for a data center/cloud 115. In FIG. 1, border router 120 is also denoted "BR1" and border router 130 is denoted "BR2". Policy server 110 makes decisions about how individual traffic flows will be routed and stores this information in a routing control table, which is distributed and downloaded to each border router 120, 130 under the control of policy server 110. The policy server 110 may be a dedicated physical computing device or a virtualized process embodied by one or more virtual machines running in a data center.

Border routers (BRs) 120 and 130 typically reside at the boundary of a local area network (LAN) and a wide area network (WAN), and may perform ingress and egress filtering on traffic flow. A tunnel 140 (Tun1) is represented for communication between border routers 120 and 130. While only two border routers are illustrated in FIG. 1 for simplicity, multiple border routers are normally deployed to optimize load sharing and improve failure tolerance. For example, border router 120 operates at the interface of LAN1 and WAN1 to communicate with a first service provider (SP) network 150, denoted SP1, and border router 130 operates at the interface of LAN2 and WAN2 to communicate with a second SP network 160, denoted SP2.

Although the examples presented herein are shown with only two border routers, the methods, apparatus and techniques are scalable to network topologies having, theoretically, an unlimited number of border routers. Moreover, a border router may be connected pairwise via a single tunnel to each border router in the network or less than the maximum number N of border routers in the network. Additionally, the techniques presented herein could be utilized to effect multistage forwarding of traffic flows, such as from a first border router, to one or more intermediate border routers, and finally, to a border router containing the designated WAN exit link.

A traffic flow is an exchange of packets between a source address (e.g., a client) and a destination address (e.g., a server). Packets are generally organized into traffic flows by examining the source and destination addresses together with the source and destination port numbers (according to protocol) of the packets.

The border routers 120 and 130 may receive traffic from one or more local area networks (LANs) of the datacenter/cloud 115, or from other border routers (not shown). In FIG. 1, in order to redirect a traffic flow incoming to the first border router, also referred to as the "anchoring" border router, to a second border router, also referred to as the "forwarding" border router, tunnel 140 (Tun1) is set up between the two border routers 120 and 130, and traffic is forwarded based upon the routing control tables provided by policy server 110. The local area networks (LAN1, LAN2) are interfaces facing the inside of the cloud, and the wide area networks (WAN1, WAN2) are interfaces facing the network of a service provider (SP1, SP2). In this example, border router 120 interfaces with router 155, also denoted R3, in SP network 150 and border router 130 interfaces with router 165, also denoted R5, in SP network 160.

Policy server 110 manages traffic flow within a data center or cloud-based environment 115 by determining how individual traffic flows will be routed. For example, in FIG. 1, policy server 110 monitors the performance characteristics of traffic flows and WAN exit link usage through WAN interfaces (WANT, WAN2) reported by each border router (BR1, BR2) 120, 130 under its control. Based on this information, policy server 110 creates routing policies by making routing control decisions to optimize traffic flow. The policy server then stores this information (i.e., routing paths) in a routing control table, which is downloaded to each border router 120 and 130 under its control. For an individual traffic flow, policy server 110 may instruct a border router to redirect its packets to another border router for better overall network performance.

To effectively manage traffic flow, the policy server 110 will need to adjust routing decisions periodically, by reconfiguring the routing control table and downloading updated policies to each border router 120 and 130. For instance, a traffic flow originally directed to a border router may need to be redirected to a different border router, in the event that the policy server detects that the performance of a particular traffic flow over a routing path drops below a pre-defined policy, causing an "Out Of Policy" error.

Depending on the manner in which updates are distributed, such updates may cause loss of application recognition or visibility, formation of traffic loops, and duplicated processing.

One or more packets of a traffic flow arrive from local area network at a border router and undergo application recognition and classification. Traffic flows may be classified based upon layer 3 and layer 4 information (L3/L4 information associated with the Open Systems Interconnection (OSI) model), as well as with software that performs application recognition, such as Network Based Application Recognition (NBAR). Based upon the instructions in the routing control table, the traffic flow is forwarded along a designated route.

One important requirement in a deployment such as that shown in FIG. 1 is to ensure fast convergence when a failure happens. A first type of failure may occur as follows. Traffic flow from router 155 in SP1 goes through border router 120 to reach the WAN side. When the WAN interface fails (goes down for any of a variety of reasons) on border router 120, border router 120 should redirect that traffic flow to border router 130 so that the traffic flow can keep flowing to its intended destination. In this scenario, border router 120 serves as a Forwarding BR that forwards the traffic flow to the WAN side before failure and border router 130 serves as a Backup BR that forwards the traffic flow after failure.

A second type of failure may also occur. A traffic flow from SP1 goes through border router 120 and the tunnel 140 to reach border router 130, and reaches the WAN side through the WAN interface of border router 130. This traffic flow is the result of a decision by the policy server 110 that WAN2 has a better quality/performance than WAN1 for a traffic flow. However, when the WAN interface of border router 130 fails, border router 130 should redirect that traffic flow to border router 120 so that the traffic flow can keep flowing to its destination. In this scenario, BR2 serves as the Forwarding BR that forwards the traffic flow to the WAN side before failure and BR1 serves as the Backup BR that forwards the traffic flow after failure.

There are several issues that need to be addressed to guarantee sub-second failure performance. First, the Forwarding BR must detect a local WAN interface failure quickly. There are many known techniques to detect local interface failure in a very short period of time (less than 10 ms). This issue is not the subject of this disclosure.

Second, once a local WAN interface failure is detected, the Forwarding BR needs to be able to quickly switch the traffic flow to the Backup BR. To ensure a minimum number of packets are dropped during this switch-over, a pre-established backup path needs to exist. When the Forwarding BR detects local WAN interface failure, the Forwarding BR switches the traffic flow to the backup path as quickly as possible.

Third, when Backup BR receives TF traffic, the backup BR should send such traffic through its local WAN interface or drop the traffic if the local WAN interface is down (has failed). Since it is desired to achieve fast failover, the policy server would have no time to distribute updated routing decisions. Therefore, the Forwarding BR needs to make a decision to forward traffic to the Backup BR first. However, by default the Backup BR's routing control table would direct the traffic flow back to Forwarding BR. This will cause a traffic loop and other unexpected issues. It is therefore important to ensure that the Backup BR sends the traffic flow through the local WAN interface or drops the traffic instead of sending the traffic back to Forwarding BR.

Techniques are presented herein to address the second and third issues presented above by leveraging Generic Routing Encapsulation (GRE) key extensions of (RFC2890) to solve the second and third problems stated above. The use herein of GRE tunneling and tunnel key extensions are only examples, and not meant to be limiting.

To this end, the PS 110 constructs and maintains three tables:

1. A Traffic Flow Table, used to classify traffic flows. An example of a Traffic Flow Table is shown at reference numeral 170.
2. A Routing Control Decision Table, used to set up normal forwarding and backup forwarding decisions. An example of a Routing Control Decision Table is shown at reference numeral 180.
3. A GRE Key-Nexthop Binding Table, used to set up GRE key bindings with forwarding paths. An example of a GRE Key-Nexthop Binding Table is shown at reference numeral 190.

According to the techniques presented herein, new entries are defined and stored in these tables to allow for fast failover in the event that a WAN interface goes down at a border router. These entries are generally referred to as "failover entries".

In the example shown in FIG. 1, there are two traffic flows. TF1 is a first traffic flow between R3 in SP1 and border router 120 over WANT and TF2 is a second traffic flow between R4 in SP2 and border router 130 over WAN2. TF1, as shown in Traffic Flow Table 170, is associated with the identifier "1.1.1.0/24 telnet" indicating that the destination of the traffic flow is "1.1.1.0/24" and that the traffic type is "telnet". Similarly, TF2 is associated with the identifier "2.2.2.0/24 ftp" indicating that the destination of the traffic flow is "2.2.2.0/24" and the traffic type is "ftp". Again, the Traffic Flow Table 170 is used to classify traffic in the network.

The Routing Control Decision Table 180 includes entries for TF1 and TF2. For TF1, the entry "BR1 WAN1/NH1" indicates that normally the traffic goes to BR1 and the next hop is NH1, which is to router R3 in SP1. Similarly, for TF2, the entry "BR2 WAN2/NH2" indicates that normally the traffic goes to BR2 and the next hop is NH2, which is to router R4 in SP2. In addition, and according to the techniques presented herein, two backup entries are inserted by the policy server 110 into the table 180, TF1-backup and TF2-backup. These two entries are used to select backup BRs when the local WAN interface fails at a border router. Thus, there is an entry "TF1-backup" and the content of this entry is "BR2 WAN2/NH2" which means that traffic for TF1 goes to BR2, and the next hop is NH2, meaning router R4 in SP2. Similarly, there is an entry "TF2-backup" and the content of this entry is "BR1 WAN1/NH1" which means that traffic for TF2 goes to BR1, and the next hop is NH1, meaning R3 in SP1. As explained hereinafter, the content of the Routing Control Decision Table 180 is sent by the policy server 110 to each of the border routers and the border routers store information derived from the Routing Control Decision Table 180 in a Routing Control Table, as described hereinafter.

The GRE Key-Nexthop Binding Table 190 is now described. A GRE Key is a number value that serves as an identifier and is contained in a field of a packet header used when the packet is to be encapsulated for routing through a GRE tunnel, e.g., tunnel 140. The table 190 has entries for when the GRE Key is 100, 200, 300 and 400. The table 190 maps (i.e., "binds") a GRE Key value to a nexthop. If incoming traffic to the BR has a GRE Key of 100, then the entry in the table that reads "NH1 or Key 400 via Tun1" means that the traffic that comes in to the BR from the tunnel 140 is to be sent to NH1 (to router R3 in SP1) or sent with GRE Key 400 (included in the GRE packet header) through the tunnel again. The "or" here indicates what is to occur when the WAN interface to NH1 is down/disabled (failed) for some reason. Thus, if the WAN interface to NH1 is down at border router 120, then border router 120 encapsulates the packet using Key 400 for forwarding via Tun1 to border router 130. If traffic coming in to the BR has a GRE Key of 400, then the entry in the table that reads "NH2 or Drop" means that the traffic coming in to the BR from the tunnel 140 is to be sent to NH2 (to router R4 in SP2) or dropped. Again, the "or" indicates what happens when the WAN interface to NH2 is down/disabled. When the incoming traffic to the BR has a GRE Key of 200, then, according to the entry "NH1 or Drop", the traffic is sent to NH1 if it is available/up, and otherwise it is dropped. Finally, if the incoming traffic to the BR has a GRE Key of 300, then according to the entry "NH2 or Key 200 via Tun1" for Key 300, the traffic is sent to NH2 if it is available/up, and otherwise it is sent in the GRE tunnel 140 with GRE Key 200.

The policy server 110 sends the information contained in tables 170, 180 and 190 to the border routers 120 and 30 (and to any other border router under its control). The border routers 120 and 130 use that information to populate a Routing Control Table and a GRE Key-Nexthop Binding Table. For example, border router 120 stores a Routing Control Table 210 and a GRE Key-Nexthop Binding Table 220 based on the information received from the policy server 110. Similarly, border router 130 stores a Routing Control Table 230 and a GRE Key-Nexthop Binding Table 240 based on the information received from the policy server 110.

For border router 120, the Routing Control Table 210 combines information from the Traffic Flow Table 170 and the Routing Decision Control Table 180. The first entry in Routing Control Table 210 is for TF1 and "WAN1/NH1" means that traffic for TF1 is sent to next hop NH1 assuming NH1 is up. The second entry is for TF1-backup and "To BR2 via Tun1, key 400" means that if the WAN1 interface to NH1 is down (has failed), then traffic for TF1 is sent to BR2 via the tunnel 140 (Tun1) and using GRE Key 400. In other words, traffic for TF1 is sent by BR1 to BR2 via tunnel 140 by encapsulating the traffic with a GRE header in which the GRE header includes the value "400" in the Key field. Furthermore, according to the last entry in Routing Control Table 210, when traffic for TF2 comes in to BR1, BR1 will send it to BR2 via the tunnel 140, and will encapsulate that traffic with a GRE header having a value "300" in the Key field. Thus, Routing Control Table 210 has entries to handle normal routing of TF1 and TF2, and an entry to handle routing of TF1 if the WAN1 interface to NH1 fails.

Similarly, the Routing Control Table 230 for border router 130 has two entries to handle normal routing of TF1 and TF2, and an entry to handle routing of TF2 if the WAN2 interface to NH2 fails. The first entry in Routing Control Table 230 is for normal traffic handling of TF1, where "To BR1 via Tun1, Key 100" means that traffic for TF1 that comes into BR2 is encapsulated with a GRE header having a Key value of "100" and is sent via Tun1 to BR1. The second entry is for normal handling of TF2 and "WAN2/NH2" and means that traffic for TF2 that comes into BR2 is directed out on WAN2 interface to NH2, i.e., to router R4 in SP2. The last entry in the table is for TF2-backup, and "To BR1 via Tun1, Key 200" means that if the WAN2 interface to NH2 fails, then traffic for TF2 is sent via Tun1 to BR1, with a GRE Key value of "200".

The GRE Key-Nexthop Binding Tables 220 and 240 are now described. What should be readily apparent is that the GRE Key-Nexthop Binding Tables 220 and 240 are identical. They each contain a nexthop binding for each Key value 100, 200, 300 and 400. For Key=100, the nexthop binding is "NH1 or Key 400 via Tun1", for Key=200, the nexthop binding is "NH1 or Drop", for Key=300, the nexthop binding is "NH2 or Key 200 via Tun1" and for Key=400, the nexthop binding is "NH2 or Drop." Again, the tables 220 and 240 are the same for BR1 and BR2, respectively.

Thus, the GRE Key-Nexthop Binding Tables 220 and 240 have additional key bindings for Key=200 and 400. These two entries indicate the traffic from the GRE tunnel should be either forwarded through the local WAN interface or dropped if the local WAN interface fails. The meaning of the other two keys, 100 and 300, are extended with additional information to indicate that the traffic received from the GRE tunnel should be either forwarded through the local WAN interface or sent to the GRE tunnel with a particular/specified key if the local WAN interface fails.

At each BR, a GRE tunnel (Tun1) will be created between Forwarding BR and Backup BR. For traffic received from the LAN, each BR will use traffic classification and its Routing Control Table to determine forwarding behavior. Conversely, for traffic received from the GRE tunnel 1400, the BR will use its GRE Key-Nexthop Binding Table to determine forwarding behavior. More specifically, whenever there is traffic coming from the GRE tunnel, the receiving BR will use the GRE Key to forward the traffic instead of using application classification logic for that traffic flow.

The Routing Control Decision Table and GRE Key-Nexthop Binding Table are stable among all BRs during failover period. These tables do not change until the policy server 110 has learned about a new topology change and has distributed new tables to the BRs after failover. Although only two BRs and two routing paths (nexthops) are shown, the concepts presented herein are not limited to any number of BRs and nexthops. For example, for Dynamic Multipoint Virtual Private Network (DMVPN), there may be thousands of spokes (nexthops).

Figure 2:
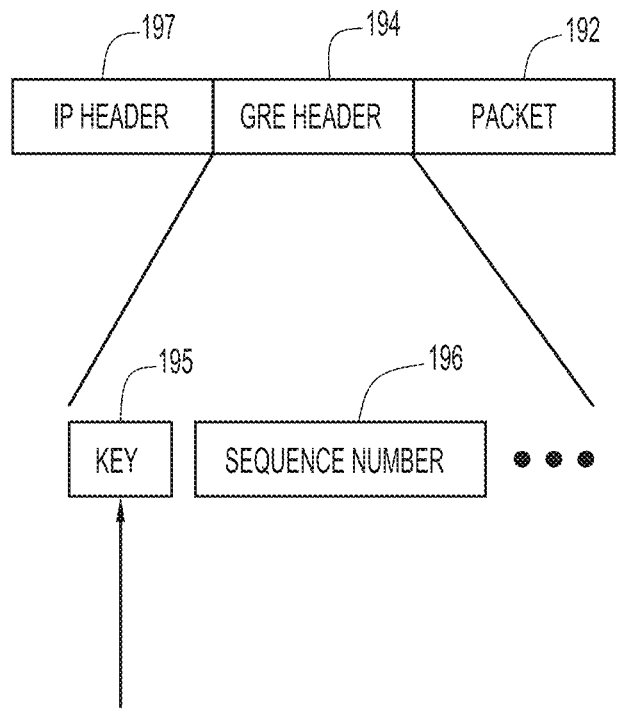
FIG. 2 is a diagram showing an example of a packet encapsulated with a tunnel key in accordance with an example embodiment.

Referring now to FIG. 2, a diagram is shown of an IP packet 192 that is encapsulated in a GRE header 194 for tunneling over a GRE tunnel. The GRE header 194 includes a variety of fields including a Key extension field 195, a sequence number field 196 and other fields not shown in FIG. 2 for simplicity. The Key extension field 195 is the field in which the aforementioned Key value is used according to the techniques described herein. An IP header 197 is placed around the GRE header 194.

As indicated in FIG. 2, the value in Key field is used for traffic sent over the GRE tunnel. The Forwarding BR sets the value for the Key field when routing packets over the GRE tunnel according to information contained in the Routing Control Table of the BR. The Receiving BR determines a routing action to be taken based on the Key value contained in the GRE header of a received packet from the GRE tunnel.

Figure 3:
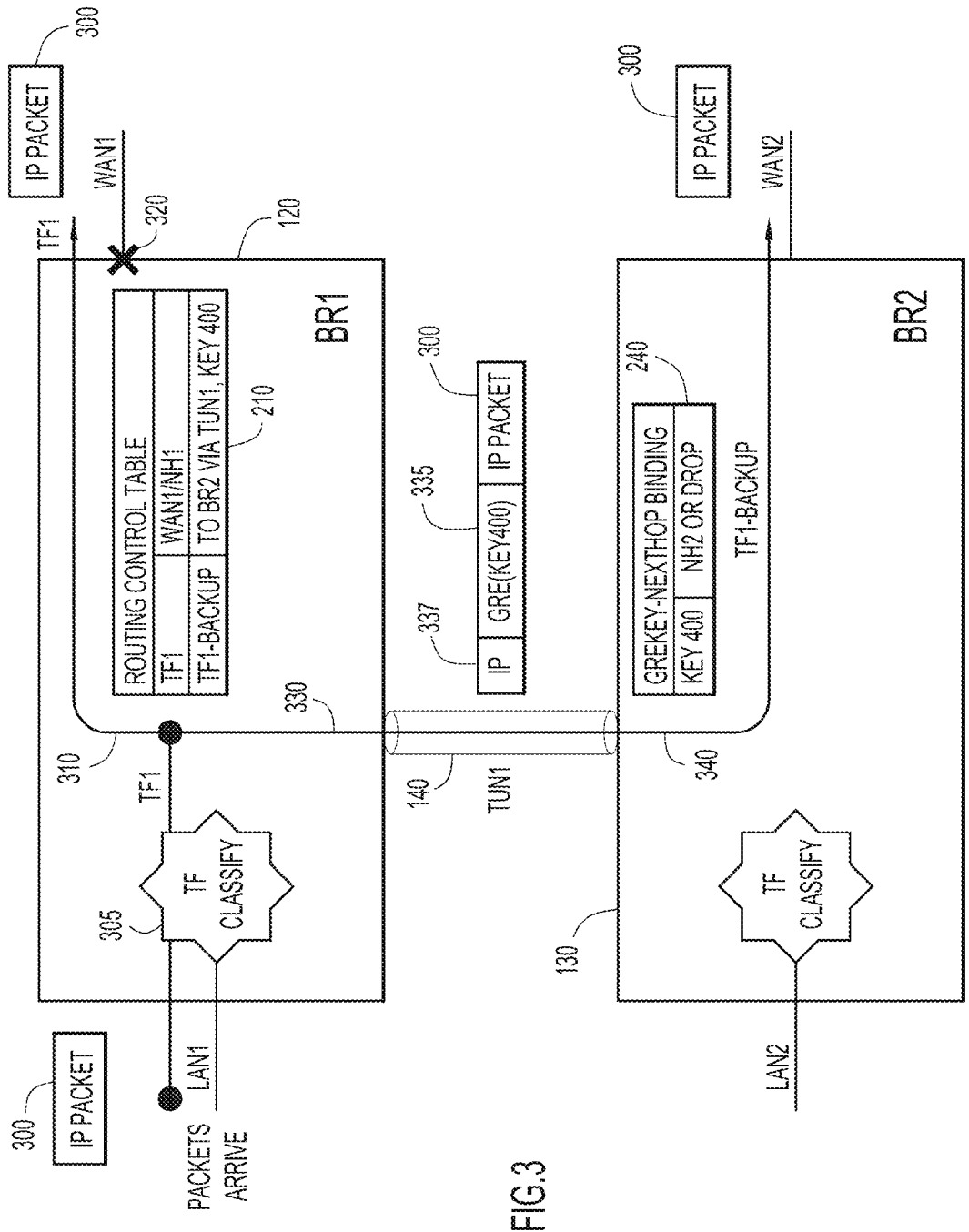
FIG. 3 is a diagram illustrating a packet flow handling scenario in accordance with an example embodiment.

Turning now to FIG. 3, an example of a first use of the pre-established failover entries stored in the Routing Control Tables and GRE Key-Nexthop Binding Tables of the border routers is now described. Shown in FIG. 3 is part of the content of Routing Control Table 210 of BR1 and part of the content of GRE Key-Nexthop Binding Table 240 of BR 2. IP packets arrive at BR1 from LAN1. An example of a packet is shown at 300. At 305, BR1 classifies the traffic as TF1, and forwards the traffic through WAN1 as shown at 310. At 320, WAN1 fails and BR1 detects this failure locally. At 330, BR1 uses the TF1-backup entry in its Routing Control Table 210 and determines that when WAN1 is not available, it is to direct the traffic to BR2, via Tun1, with Key 400 used when encapsulating the traffic over Tun1. The encapsulated packets are forwarded over Tun1 to BR2. FIG. 3 shows the original IP packet 300, the GRE header 335 (with Key 400) encapsulating the IP packet 300, and an outer IP header 337.

At 340, BR2 receives traffic encapsulated with GRE Key 400. BR2 uses its GRE Key-Nexthop Binding Table 340 and determines that this traffic is to be forwarded through WAN2 (if WAN2 is available) or dropped if WAN2 has failed. FIG. 3 shows the example where WAN2 is available and the original packet 300, decapsulated from the GRE header, is forwarded on the WAN2 interface by BR2. Note that BR2 does not use its Routing Control Table for purposes of determining how to handle traffic received from the GRE tunnel 140 (Tun1). It only uses its GRE Key-Nexthop Binding Table 240. Conversely, BR1 only uses its Routing Control Table 210 when determining how to forward traffic received from LAN1. A pre-established backup entry in the Routing Control Table 210 of BR1 and a pre-established entry in the GRE Key-Nexthop Binding Table 240 of BR2 are used to handle the scenario shown in FIG. 3.

Figure 4:
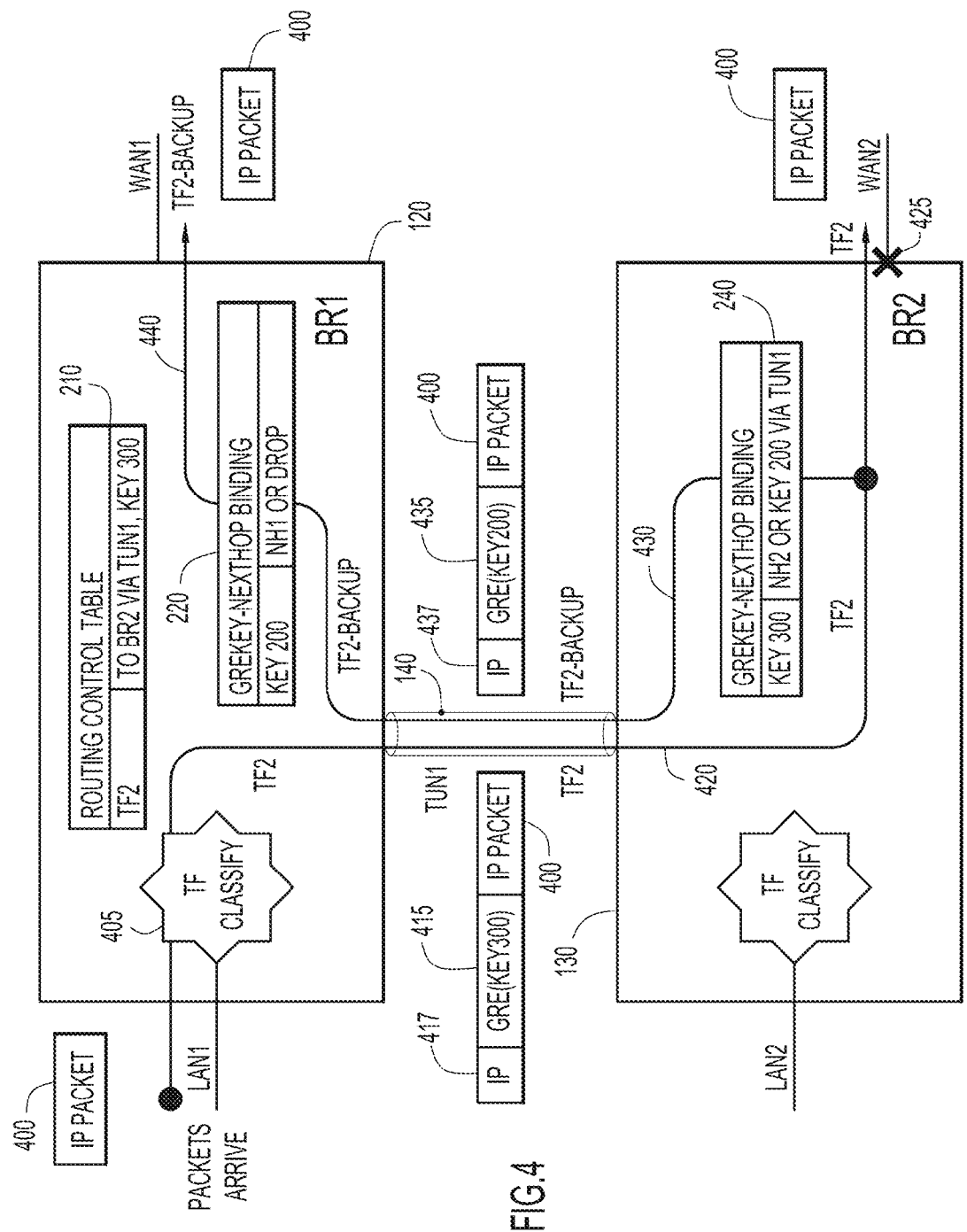
FIG. 4 is a diagram illustrating a packet flow handling scenario according to an example embodiment.

Reference is now made to FIG. 4 for description of another use case of the pre-established backup entries. An IP packet 400 arrives at BR1 and at 405 BR classifies it as TF2. Therefore, according to the Routing Control Table 210, BR1 forwards that the packet 400 to BR2 via Tun1, encapsulated using a GRE Key 300. FIG. 4 shows packet 400, encapsulated with a GRE header 415 with Key 300, and encapsulated in an outer IP header 417. At 420, BR2 receives the encapsulated packet via Tun1 with GRE Key 300 and refers to its GRE Key-Nexthop Binding Table 240 to determine that the packet should be forwarded to WAN2 if it is available. However, at 425, WAN2 fails and BR2 detects this failure locally. Since WAN2 fails, BR2 determines, from GRE Key-Nexthop Binding Table 240, that the packet 400 should be forwarded over Tun1 with GRE Key 200. Therefore, at 430, BR2 encapsulates packet 400 with a GRE header 435 with Key 200 encapsulated in an outer IP header 437. The encapsulated packet is forwarded over Tun1 to BR1. At 440, BR1 uses its GRE Key-Nexthop Binding Table 220 to determine how to handle the packet received over Tun1 from BR2. Specifically, BR1 determines that the packet has GRE Key 200 in its GRE header and therefore determines that it should send the packet out to NH1 if the WAN1 interface is available or drop the packet of the WAN1 interface is not available. In the example of FIG. 4, the WAN1 interface is available and the packet 400 is sent to NH1.

With both scenarios (FIGS. 3 and 4), different actions are assigned to a GRE key when a BR determines that a local WAN interface fails. For example, on BR1, when WAN1 is up, both Key 100 and Key 200 will cause BR1 to forward traffic through WAN1. When WAN1 fails, Key 100 causes BR1 to send the traffic via Tun1 with GRE Key 400, whereas Key 200 will cause BR1 to drop the traffic. This setup is necessary to avoid a traffic loop regardless of whether the local WAN interface is up or down.

To summarize, the policy server inserts a backup entry for each traffic flow in the Routing Control Table. Each backup entry provides a backup path to be used by a BR when the BR determines that the local WAN fails. This action definition is expanded for each GRE Key in GRE Key-Nexthop Binding Table. In addition to normal forwarding path, each GRE key indicates forwarding actions when the BR determines that the local WAN fails: drop the traffic or use the GRE tunnel. In addition, the policy server inserts extra/additional GRE keys in GRE Key-Nexthop Binding Table, where each such key provides a backup path for tunnel traffic when the local WAN fails.

Figure 5:
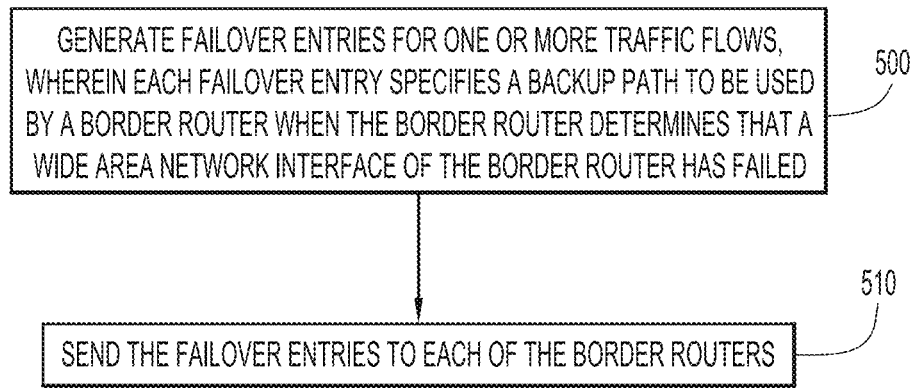
FIG. 5 is a flow chart generally depicting the operations performed by the policy server according to an example embodiment.

Turning now to FIG. 5, a flow chart is shown that summarizes the operations performed by the policy server in accordance with the techniques presented herein. At 500, the policy server or any control entity in communication with a plurality of border routers in a network, generates failover entries for one or more traffic flows. Each failover entry specifies a backup path to be used by a border router when the border router determines that a wide area network interface of the border router has failed. At 510, the failover entries are sent to each of the border routers for storage and use in real-time as the border routers handle traffic.

Generating the failover entries includes generating a backup entry for each traffic flow in the network, wherein each backup entry comprising information configured to cause a first border router at which a wide area network interface has failed to select a second border router. Furthermore, generating the backup entry includes generating information specifying a tunnel key to be used when encapsulating packets to be forwarded via the tunnel from the first border router to the second border router. As described in the foregoing examples, the tunnel key may be a GRE Key.

Further, generating the failover entries includes generating tunnel key-to-nexthop bindings to indicate, based on a tunnel key used in a header in which the packets are encapsulated for forwarding via the tunnel, that packets for traffic received by the second border router via the tunnel are either to be forwarded through a wide area network interface of the second border or dropped if the wide area network interface of the second border router has failed.

Further still, generating the failover entries includes generating information for tunnel keys to indicate that traffic received by the second border router from the tunnel should either be forwarded through the wide area network interface of the second border router or forwarded via the tunnel with a particular tunnel key if the wide area network interface of the second border router has failed.

Figure 6:
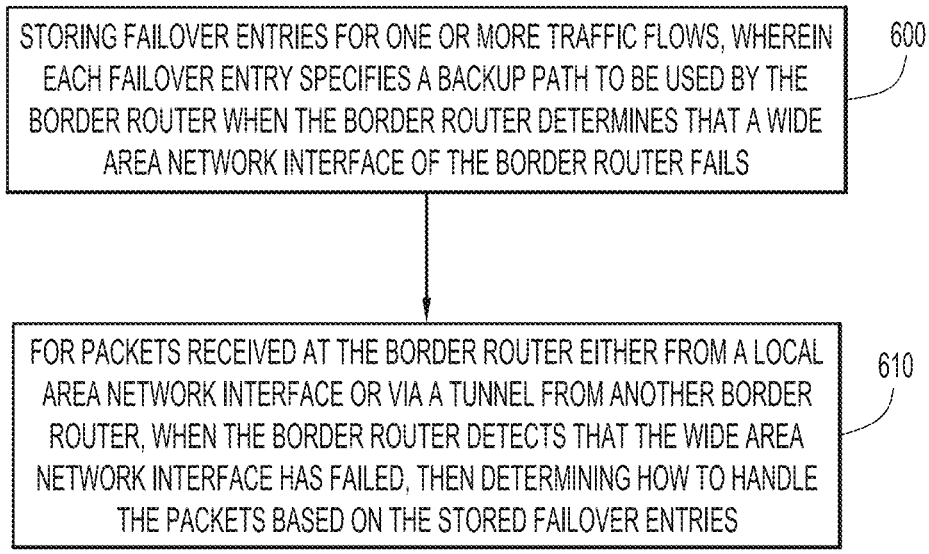
FIG. 6 is a flow chart generally depicting the operations performed by a border router according to an example embodiment.

Reference is now made to FIG. 6. FIG. 6 is a flow chart that summarizes the operations performed by a border router according to the techniques presented herein. At 600, a border router operating in a network stores failover entries for one or more traffic flows, wherein each failover entry specifies a backup path to be used by the border router when the border router determines that a wide area network interface of the border router fails. The border router receives the failover entries from the policy server, for example. At 610, for packets received at the border router either from a local area network interface or via a tunnel from another border router, when the border router detects that the wide area network interface has failed, the border router determines how to handle the packets based on the stored failover entries.

In storing the failover entries, the border router stores a backup entry for each traffic flow in the network. Each backup entry comprises information configured to cause the border router to select another border router and to route traffic to the other border router via a tunnel and specifying a tunnel key to be used when encapsulating the packets for forwarding to the other border router via the tunnel. Thus, for packets for a traffic flow received at a local area network interface of the border router, the border router uses a stored backup entry for the traffic flow to determine to redirect packets for the traffic flow via the tunnel to the other border router, and to include the tunnel key in a header when encapsulating the packets for forwarding to the other border router via the tunnel.

Moreover, the border router, in storing failover entries, the border router may store tunnel key-to-nexthop bindings to indicate, based on a tunnel key used in a header in which the packets are encapsulated for forwarding via the tunnel, that packets for traffic received by the border router via the tunnel are either to be forwarded through the wide area network interface of the border router or dropped if the wide area network interface of the border router has failed. For packets received via the tunnel from the other border router, the border router uses the stored tunnel key-to-nexthop bindings to determine, based on a tunnel key contained in the header in which the packets are encapsulated, whether to forward the packets through the wide area network interface of the border router or drop the packets if the wide area network interface of the border router has failed.

Further still, the border router, in storing failover entries, may store information for tunnel keys to indicate that traffic received by the border router via the tunnel should either be forwarded through the wide area network interface of the border router or forwarded via the tunnel with a particular tunnel key if the wide area network interface on the border router has failed. Thus, for packets received by the border router via the tunnel, the border router uses the stored information for tunnel keys, to determine whether to forward the packets through the wide area network interface of the border router or to forward the packets via the tunnel with the particular tunnel key if the border router has failed.

Figure 7:
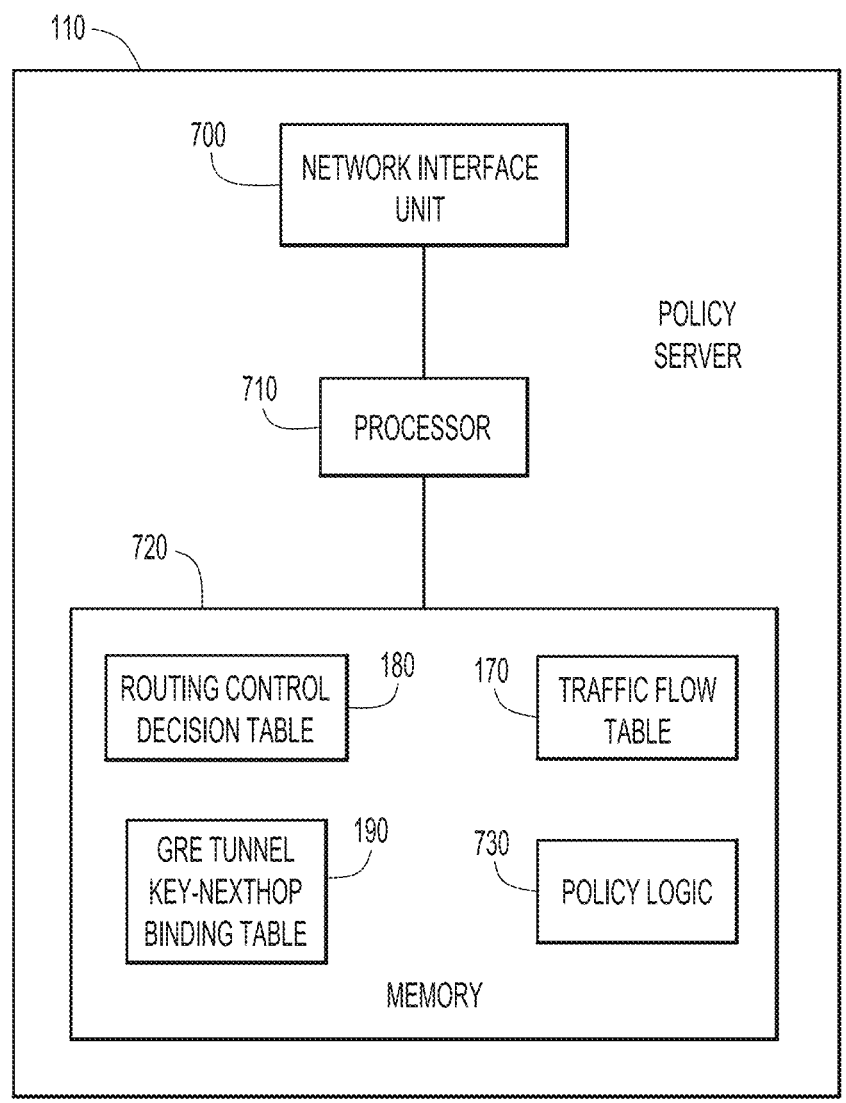
FIG. 7 is an example block diagram of the policy server configured to perform the techniques presented herein according to an example embodiment.

FIG. 7 illustrates an example block diagram of the policy server 110. The policy server 110 is a computing entity that is capable of generating and disseminating routing related information. To this end, the policy server 110 includes a network interface unit 700, a processor (or multiple processors) 710 and a memory 720. The network interface unit 700 is a network interface card or similar device that is configured to enable communications over a network. This enables the policy server 110 to communicate with the border routers and other network elements in a network. The processor 710 is a microprocessor or microcontroller, for example.

The memory 720 is one or more computer readable storage media that may comprise read only memory (ROM), random access memory (RAM), magnetic disk storage media devices, optical storage media devices, flash memory devices, electrical, optical, or other physical/tangible memory storage devices. The memory stores instructions for policy logic 730 that, when executed by the processor 710, causes the processor 710 to generate the aforementioned Traffic Flow Table 170, Routing Control Decision Table 180 and GRE Key-Nexthop Binding Table 190, and to cause these tables to be sent to the border routers under control of the policy server 110.

Thus, in general, the memory 720 may comprise one or more tangible computer readable storage media (e.g., a memory device) encoded with software comprising computer executable instructions and when the software is executed (by the processor 710) it is operable to perform the policy server operations described herein.

Figure 8:
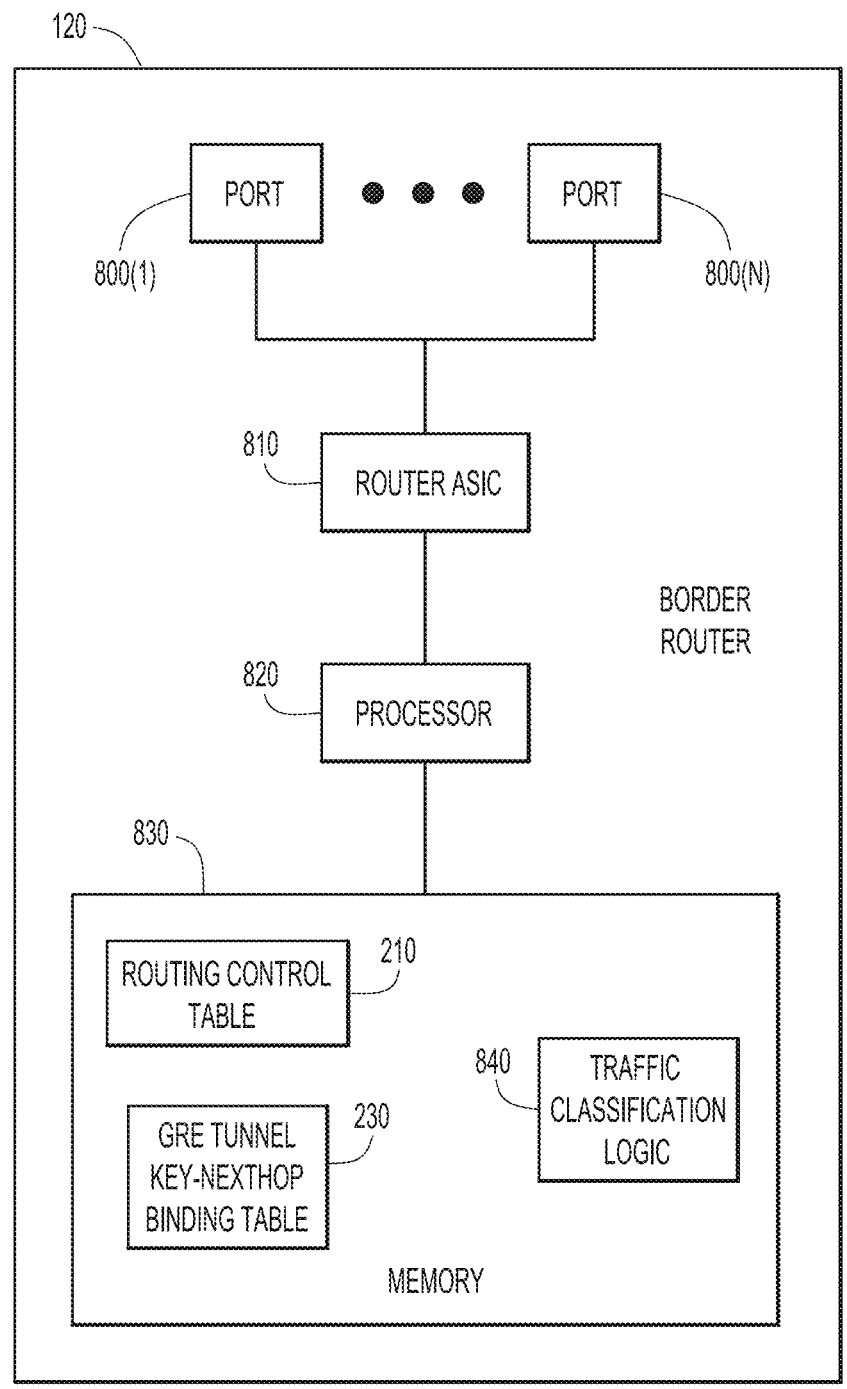
FIG. 8 is an example block diagram of a border router configured to perform the techniques presented herein according to an example embodiment.

Turning now to FIG. 8, an example block diagram of a border router is shown, e.g., border router 120. This diagram is equally applicable to and representative of any border router referred to herein, such as border router 130. The border router includes a plurality of ports 800(1)-800(N) that are configured to send packets to and/or receive packets from the network. A router Application Specific Integrated Circuit (ASIC) 810 is provided that serves to perform various network processing (e.g., routing) operations. A processor 820 is coupled to the router ASIC 810 and to a memory 830. The processor 820 may be a microprocessor or microcontroller. The memory 830, may take a form similar to the memory referred to in FIG. 7, and stores instructions that are executable by the processor 820. In particular, the memory 830 stores instructions for traffic classification, encapsulation and forwarding logic 840, as well as the aforementioned Routing Control Table 210 and GRE Key-Nexthop Binding Table 220. Thus, in general, the memory 830 may comprise one or more tangible computer readable storage media (e.g., a memory device) encoded with software comprising computer executable instructions and when the classification, encapsulation, and forwarding logic 840 software is executed (by the processor 920) it is operable to perform the operations described herein for a border router. In other approaches, the binding table and the routing control table are stored in the router ASIC 810.

Using the techniques presented herein, several advantages can be achieved. Traffic outage is minimized because when a WAN interface fails, traffic flows are guaranteed to be quickly switched to a backup path. In addition, no traffic loops can occur. Furthermore, there is only one traffic classification no matter how traffic flow is directed before or after a WAN interface failure. Finally, these techniques are highly scalable because there is only one GRE tunnel needed between the Forwarding BR and Backup BR.

The techniques disclosed herein may be applied to any solution of centralized controlled application performance based WAN path optimization. The techniques described herein may also be used to scan incoming network traffic to identify whether deterministic binding between a GRE key and a routing path is being used.

In summary, according to one embodiment, a method is provided in which, at a control entity in communication with a plurality of border routers in a network, failover entries for one or more traffic flows are generated, wherein each failover entry specifies a backup path to be used by a border router when the border router determines that a wide area network interface of the border router has failed. The failover entries are sent to each of the border routers.

According to another embodiment, at a border router operating in a network, failover entries for one or more traffic flows are stored, wherein each failover entry specifies a backup path to be used by the border router when the border router determines that a wide area network interface of the border router fails. For packets received at the border router either from a local area network interface or via a tunnel from another border router, when the border router detects that the wide area network interface has failed, the border router determines how to handle the packets based on the stored failover entries.

According to another embodiment, an apparatus is provided comprising: a plurality of ports configured to send packets to and receive packets from a network, including a local area network interface and a wide area network interface; a router processor unit coupled to the plurality of ports and configured to control routing of packets in the network; and a processor coupled to the router processor unit. The processor is configured to: store failover entries for one or more traffic flows, wherein each failover entry specifies a backup path to be used by a border router when it is determined that a wide area network interface of the border router fails; and for packets received from the local area network interface or via a tunnel from an other border router, determine how to handle the packets based on the stored failover entries when the wide area network interface has failed.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
  at a control entity in communication with a plurality of a border routers in a network, the plurality of border routers connecting one or more wide area networks and a local area network, generating failover entries for one or more traffic flows, wherein each failover entry includes information configured to cause a first border router, at which a wide area network interface has failed, to select a second border router specifying a backup path to be used by the first border router when the first border router determines that the wide area network interface of the first border router has failed;
  generating, in the failover entries, tunnel key-to-nexthop bindings to indicate, based on a tunnel key used in a header in which packets are encapsulated for forwarding via the backup path in a tunnel from the first border router to the second border router, that the packets for traffic received by the second border router via the tunnel are either to be forwarded through a wide area network interface of the second border or dropped if the wide area network interface of the second border router has failed; and
  sending the failover entries to each of the border routers, the failover entries further specifying how the second border router is to handle network traffic received from the first border router over the backup path.

2. The method of claim 1, wherein generating the failover entries comprises generating information specifying the tunnel key to be used when encapsulating packets to be forwarded via the backup path in a tunnel from the first border router to the second border router.

3. The method of claim 2, wherein the tunnel key is a value in a field of a Generic Routing Encapsulation (GRE) header.

4. The method of claim 2, wherein generating the failover entries comprises:
  generating information for tunnel keys to indicate that traffic received by the second border router from the tunnel should either be forwarded through the wide area network interface of the second border router or forwarded via the tunnel with a particular tunnel key if the wide area network interface of the second border router has failed.

5. A method comprising:
  at a first border router operating to connect one or more wide area networks and a local area network, storing failover entries for one or more traffic flows, wherein each failover entry includes information configured to cause the first border router, at which a wide area network interface has failed, to select a second border router and specifying a backup path to be used by the first border router when the first border router determines that a wide area network interface of the first border router fails;
  storing, in the failover entries, tunnel key-to-nexthop bindings to indicate, based on a tunnel key used in a header in which packets are encapsulated for forwarding via a tunnel from the second border router, that the packets for traffic received by the first border router via the tunnel from the second border router are either to be forwarded through the wide area network interface of the first border router or dropped if the wide area network interface of the first border router has failed; and
  for packets associated with a respective traffic flow received at the first border router either from a local area network interface or via a tunnel from another border router, when the first border router detects that the wide area network interface has failed, forwarding the packets to the second border router along the backup path specified in a respective failover entry.

6. The method of claim 5, wherein storing failover entries comprises storing failover entries specifying the tunnel key to be used when encapsulating the packets for forwarding to the second border router via the backup path in the tunnel between the first border router and the second border router.

7. The method of claim 6, wherein for packets for the respective traffic flow received at the local area network interface of the first border router, using a stored failover entry for the traffic flow to determine to redirect packets for the respective traffic flow via the tunnel to the second border router, and to include the tunnel key in a header when encapsulating the packets for forwarding to the second border router via the tunnel.

8. The method of claim 7, wherein the tunnel key is a value in a field of a Generic Routing Encapsulation (GRE) protocol header.

9. The method of claim 5, wherein for packets received via the tunnel from the second border router, using the stored tunnel key-to-nexthop bindings to determine, based on the tunnel key contained in the header in which the packets are encapsulated, whether to forward the packets through the wide area network interface of the first border router or drop the packets if the wide area network interface of the first border router has failed.

10. The method of claim 5, wherein storing failover entries comprises storing information for tunnel keys to indicate that traffic received by the first border router via the tunnel should either be forwarded through the wide area network interface of the first border router or forwarded via the tunnel with a particular tunnel key if the wide area network interface of the first border router has failed.

11. The method of claim 10, wherein for packets received by the first border router via the tunnel, using the stored information for tunnel keys to determine whether to forward the packets through the wide area network interface of the first border router or to forward the packets to the second border router via the tunnel with the particular tunnel key if the wide area network interface of the first border router has failed.

12. An apparatus comprising:
a plurality of ports configured to send packets to and receive packets from a local area network and one or more wide area networks, including a local area network interface and a wide area network interface;
a router processor unit coupled to the plurality of ports and configured to control routing of packets in the local area network;
a processor coupled to the router processor unit, and configured to:
store failover entries for one or more traffic flows, wherein each failover entry includes information configured to cause the processor of a first border router to select a second border router and specifying a backup path to be used by the first border router when it is determined that a wide area network interface of the first border router fails;
store, in the failover entries, tunnel key-to-nexthop bindings to indicate, based on a tunnel key used in a header in which packets are encapsulated for forwarding via a tunnel from the second border router, that the packets for traffic received by the first border router via the tunnel are either to be forwarded through the wide area network interface of the first border router or dropped if the wide area network interface of the first border router has failed; and
for packets associated with a respective traffic flow received from the local area network interface or via a tunnel from another border router, when the wide area network interface has failed, forward the packets to the second border router along the backup path specified in a respective failover entry.

13. The apparatus of claim 12, wherein the processor is configured to store failover entries by storing information specifying the tunnel key to be used when encapsulating the packets for forwarding to the second border router via the backup path in the tunnel between the first border router and the second border router.

14. The apparatus of claim 13, wherein the processor is configured to, for packets for the respective traffic flow received at the local area network interface, use a stored failover entry for the traffic flow to determine to redirect packets for the respective traffic flow via the tunnel to the second border router, and to include the tunnel key in a header when encapsulating the packets for forwarding to the second border router via the tunnel.

15. The apparatus of claim 13, wherein the processor is configured to store information for tunnel keys to indicate that traffic received by the first border router via the tunnel should either be forwarded through the wide area network interface of the first border router or forwarded to the second border router via the tunnel with a particular tunnel key if the wide area network interface of the first border router has failed.

16. The apparatus of claim 15, wherein the processor is configured to, for packets received by the first border router via the tunnel, use the stored information for tunnel keys to determine whether to forward the packets through the wide area network interface of the first border router or to forward the packets to the second border router via the tunnel with the particular tunnel key if the wide area network interface of the first border router has failed.

17. The apparatus of claim 12, wherein the processor is configured to, for packets received at the first border router via the tunnel from the second border router, use the stored tunnel key-to-nexthop bindings to determine, based on the tunnel key contained in the header in which the packets are encapsulated, whether to forward the packets through the wide area network interface of the first border router or drop the packets if the wide area network interface of the first border router has failed.

* * * * *